United States Patent
Miyake et al.

(10) Patent No.: US 8,366,117 B2
(45) Date of Patent: Feb. 5, 2013

(54) SEALING DEVICE

(75) Inventors: Tomoki Miyake, Tokyo (JP); Yasuhiro Ikeda, Tokyo (JP); Masanobu Kimura, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 41 days.

(21) Appl. No.: 12/671,424

(22) PCT Filed: Jul. 24, 2008

(86) PCT No.: PCT/JP2008/063272
§ 371 (c)(1),
(2), (4) Date: Jan. 29, 2010

(87) PCT Pub. No.: WO2009/017022
PCT Pub. Date: Feb. 5, 2009

(65) Prior Publication Data
US 2010/0187770 A1    Jul. 29, 2010

(30) Foreign Application Priority Data

Aug. 2, 2007 (JP) .................. 2007-201821

(51) Int. Cl.
*F16J 15/32* (2006.01)
(52) U.S. Cl. .................. 277/577; 277/576; 277/572
(58) Field of Classification Search .................. 277/549, 277/551, 562, 564, 568, 572, 573, 574, 576, 277/577
See application file for complete search history.

(56) References Cited

U.S. PATENT DOCUMENTS

| | | | | |
|---|---|---|---|---|
| 3,227,497 | A * | 1/1966 | Heckethorn | 384/16 |
| 3,396,975 | A * | 8/1968 | Otto | 277/573 |
| 4,544,168 | A * | 10/1985 | Hans et al. | 277/353 |
| 4,623,153 | A * | 11/1986 | Nagasawa | 277/551 |
| 5,332,232 | A | 7/1994 | Kurose | |
| 6,401,322 | B1 * | 6/2002 | Matsushima | 29/460 |
| 6,457,723 | B1 * | 10/2002 | Yamada et al. | 277/572 |
| 7,147,229 | B2 * | 12/2006 | Madigan | 277/551 |
| 7,347,424 | B2 * | 3/2008 | Madigan | 277/551 |
| 2006/0249915 | A1 * | 11/2006 | Madigan | 277/551 |
| 2009/0189357 | A1 * | 7/2009 | Madigan | 277/551 |

FOREIGN PATENT DOCUMENTS

| | | |
|---|---|---|
| JP | 2-132173 U | 11/1990 |
| JP | 4-73659 U | 6/1992 |
| JP | 07-305773 A | 11/1995 |
| JP | 2005-30558 A | 8/2006 |

* cited by examiner

*Primary Examiner* — Gilbert Lee
(74) *Attorney, Agent, or Firm* — Arent Fox LLP

(57) ABSTRACT

A sealing device which includes an annular exterior sealing member; a reinforcing ring disposed in a housing hole to surround an outer circumference of a rotating shaft and to press a fitting portion of the exterior sealing member against an inner circumference surface of the housing hole; a retainer mounted in the reinforcing ring; an auxiliary sealing member having one end portion that is pinched and retained between the retainer and the reinforcing ring and the other end portion that is pressed against the outer circumference surface of the rotating shaft; and an elastic tongue piece and an engagement portion that are provided between the retainer and the reinforcing ring.

5 Claims, 12 Drawing Sheets

PRIOR ART

SEALING DEVICE

TECHNICAL FIELD

The present invention relates to a sealing device that is interposed between a housing hole and a shaft.

BACKGROUND ART

As illustrated in FIG. 12, a sealing device is provided between a rotating shaft 1 of a compressor and a housing hole 2a of a housing 2 in a refrigerating machine provided in a cooling apparatus, for example. The sealing device prevents leakage of a fluid, such as refrigerant gas and refrigerating machine oil, enclosed in the housing 2, to the outside through a gap between the housing 2 and the rotating shaft 1. The sealing device includes a reinforcing ring 3, an exterior sealing member 4, an auxiliary sealing member 5, and a retainer 6.

The reinforcing ring 3 is a cylindrical member formed of metal. The reinforcing ring 3 has an inside diameter that is larger than an outside diameter of the rotating shaft 1, and the reinforcing ring 3 has an outside diameter that is smaller than an inside diameter of the housing hole 2a. A pinching base portion 3a is formed in the reinforcing ring 3. The pinching base portion 3a is bent at a substantially right angle, and a leading end portion of the pinching base portion 3a is orientated toward a central portion side.

The exterior sealing member 4 is molded using an elastomer that has rubber-like elasticity. The exterior sealing member 4 includes a fitting portion 4a and a sealing lip portion 4b. The fitting portion 4a is provided such that an outer circumference portion of the reinforcing ring 3 is covered therewith. The sealing lip portion 4b is extended from one end portion of the reinforcing ring 3. The fitting portion 4a is molded such that an outside diameter of the fitting portion 4a is larger than an inside diameter of the housing hole 2a. The sealing lip portion 4b is formed into a tapered cylindrical shape such that an inside diameter of an extended end portion of the sealing lip portion 4b is smaller than an outside diameter of the rotating shaft 1. The exterior sealing member 4 is integrally formed with the reinforcing ring 3 by curing adhesion.

The auxiliary sealing member 5 includes a cylindrical sealing lip portion 5a and a flange portion 5b that is extended radially outward from one end portion of the sealing lip portion 5a. The auxiliary sealing member 5 is molded using a synthetic resin material whose rigidity is higher than that of the elastomer. An inside diameter of the sealing lip portion 5a is smaller than an outside diameter of the rotating shaft 1.

The retainer 6 formed of metal is mounted inside the reinforcing ring 3. An inner cylinder portion 6a and a pinching portion 6b are provided in the retainer 6. An outside diameter of the inner cylinder portion 6a is smaller than an inside diameter of the reinforcing ring 3. The pinching portion 6b is formed into a circular disk that is extended toward a central portion from one end portion of the inner cylinder portion 6a. An insertion hole is formed in the central portion of the pinching portion 6b such that the rotating shaft 1 is inserted therethrough. The retainer 6 is mounted in the reinforcing ring 3 while the auxiliary sealing member 5 is disposed. The retainer 6 pinches and retains the flange portion 5b of the auxiliary sealing member 5 between the pinching portion 6b and the pinching base portion 3a of the reinforcing ring 3.

In the sealing device configured as described above, the sealing lip portion 4b of the exterior sealing member 4 is mounted in the housing hole 2a while orientated inward of the housing 2, and the rotating shaft 1 is inserted through the central portion thereof. At this point, the reinforcing ring 3 presses the fitting portion 4a of the exterior sealing member 4 against an inner circumference surface of the housing hole 2a. A leading end portion of the sealing lip portion 4b of the exterior sealing member 4 is pressed against an outer circumference surface of the rotating shaft 1. An inner circumference surface of the sealing lip portion 5a of the auxiliary sealing member 5 is pressed against an outer circumference surface of the rotating shaft 1. The leading end portion of the sealing lip portion 4b of the exterior sealing member 4 is supported from the inner circumference side by the sealing lip portion 5a.

As a result, a gap between the housing hole 2a that is formed in the housing 2 and the rotating shaft 1 of the compressor is sealed by the exterior sealing member 4 and the auxiliary sealing member 5 so that the leakage of the fluid, such as the refrigerant gas and the refrigerating machine oil, from the inside of the housing 2 to the outside can be prevented (for example, see Patent Document 1).

Patent Document 1: Japanese Laid-open Patent Publication No. 7-305773 (FIG. 1)

DISCLOSURE OF INVENTION

Problem to be Solved by the Invention

In order to secure the sealing effect in the sealing device, it is necessary to securely pinch and retain the flange portion 5b between the reinforcing ring 3 and the retainer 6 to determine a position at which the auxiliary sealing member 5 is disposed. The auxiliary sealing member 5 supports the leading end portion of the sealing lip portion 4b by the sealing lip portion 5a. The deviation of the position of the auxiliary sealing member 5 possibly influences the sealing effect between the outer circumference surface of the rotating shaft 1 and the sealing lip portion 4b.

Therefore, an opening end portion of the reinforcing ring 3 is conventionally bent (so-called "caulking") inward after the retainer 6 is mounted in the reinforcing ring. The flange portion 5b of the auxiliary sealing member 5 is pinched and retained between the retainer 6, which is retained by a bent portion 3b of the reinforcing ring 3, and the pinching base portion 3a, thereby preventing the position deviation of the auxiliary sealing member 5.

In the conventional sealing device, because the necessity of additional component is eliminated, the degradation of the sealing effect can be prevented without increasing production cost caused by the increased number of components. However, the opening end portion of the reinforcing ring 3 cannot previously be caulked before the retainer 6 is mounted in the reinforcing ring 3. Each time the sealing device is assembled, it is necessary that the bent portion 3b be formed by the caulking of the reinforcing ring 3 after the retainer 6 is mounted in the reinforcing ring 3. Accordingly, not only the assembling work becomes troublesome, but also the production cost is increased due to the increased number of assembling processes.

In view of the foregoing, an object of the invention is to provide a sealing device in which the degradation of the sealing effect, which is caused by the position deviation of the auxiliary sealing member, can be prevented without requiring the troublesome assembling work or the increased production cost.

Means for Solving Problem

To achieve the object, a sealing device according to claim 1 of the present invention includes an exterior sealing member that is annularly molded using an elastomer and includes a fitting portion and a sealing lip portion, the fitting portion is configured to be fitted in a housing hole, the sealing lip portion is configured to be pressed against an outer circumference surface of a shaft; a reinforcing ring that is formed into an annular shape and retains the fitting portion of the exterior sealing member in an outer circumference thereof, the reinforcing ring having a leading end portion from which the sealing lip portion of the exterior sealing member extends, the reinforcing ring is configured to be disposed in the housing hole so as to surround an outer circumference of the shaft and to press the fitting portion of the exterior sealing member against an inner circumference surface of the housing hole; a retainer that is mounted in the reinforcing ring; an auxiliary sealing member that has one end portion that is pinched and retained between the retainer and the reinforcing ring in the reinforcing ring and has the other end portion that is pressed against the outer circumference surface of the shaft; and an elastic engagement unit that is provided between the retainer and the reinforcing ring, the elastic engagement unit is configured to deform elastically to permit the retainer to be accommodated in the reinforcing ring when the retainer is mounted in the reinforcing ring and is configured to be elastically restored to engage with a counterpart to prevent the retainer from dropping out of the reinforcing ring when the auxiliary sealing member is pinched and retained between the retainer and the reinforcing ring.

In the sealing device according to claim 2 of the present invention as set forth in claim 1, the reinforcing ring includes a cylindrical mounting portion, the retainer is formed into a cylindrical shape and includes a pinching portion that pinches and retains the one end portion of the auxiliary sealing member between the reinforcing ring and the pinching portion, the elastic engagement unit includes an engagement portion that is formed adjacent to the mounting portion in the reinforcing ring and has an inside diameter that is smaller than an inside diameter of the mounting portion, and a plurality of elastic tongue pieces that is extended from a region forming an outer circumference edge of the pinching portion of the retainer, in a no-load state, the plurality of elastic tongue pieces form a circumscribed circle that is larger than the inside diameter of the engagement portion, when the plurality of elastic tongue pieces elastically deform inward, the plurality of elastic tongue pieces form a circumscribed circle that is smaller than the inside diameter of the engagement portion, and when the auxiliary sealing member is pinched and retained between the reinforcing ring and the retainer, the plurality of elastic tongue pieces are disposed in the mounting portion of the reinforcing ring through the engagement portion of the reinforcing ring.

In the sealing device according to claim 3 of the present invention as set forth in claim 1, the reinforcing ring includes a cylindrical mounting portion, the retainer is formed into a cylindrical shape and includes a pinching portion and an inner cylinder portion, the pinching portion is configured to pinch and retain the one end portion of the auxiliary sealing member between the reinforcing ring and the pinching portion, the inner cylinder portion having an outside diameter that is insertable in the mounting portion, the elastic engagement unit includes an elastic protrusion protruded inward from a region adjacent to the mounting portion in the reinforcing ring, the elastic protrusion is configured to form, in a no-load state, an inscribed circle that is smaller than the outside diameter of the inner cylinder portion and is configured to form an inscribed circle that is larger than the outside diameter of the inner cylinder portion when the elastic protrusion deforms elastically outward, and when the auxiliary sealing member is pinched and retained between the reinforcing ring and the retainer, the inner cylinder portion of the retainer is disposed in the mounting portion through the elastic protrusion.

In the sealing device according to claim 4 of the present invention as set forth in claim 1, the elastic engagement unit is formed in an end portion of an opening of the reinforcing ring, in which the retainer is mounted.

Effect of the Invention

In the sealing device according to the aspect of the invention, the elastic engagement unit is provided between the retainer and the reinforcing ring. When the retainer is mounted in the reinforcing ring, the elastic engagement unit deforms elastically to permit the retainer to be accommodated in the reinforcing ring. Also, when the auxiliary sealing member is pinched and retained between the retainer and the reinforcing ring, the elastic engagement unit is elastically restored to engage with a counterpart so as to prevent the retainer from dropping out of the reinforcing ring. The elastic engagement unit can be directly formed in the retainer or the reinforcing ring, so that the position deviation of the auxiliary sealing member can be prevented without requiring additional components. Thus, the increase of the production cost, which is caused by the increased number of components, can be prevented while securing the sealing effect. The elastic engagement unit can previously be formed in the reinforcing ring or retainer before the retainer is mounted in the reinforcing ring. Accordingly, in assembling the sealing device, the drop-out of the retainer can be prevented by simply mounting the retainer in the reinforcing ring. Therefore, the increase of the production cost, which is caused by the troublesome assembling work or the increased number of assembling processes, can be eliminated.

EXPLANATIONS OF LETTERS OR NUMERALS

Figure 1:
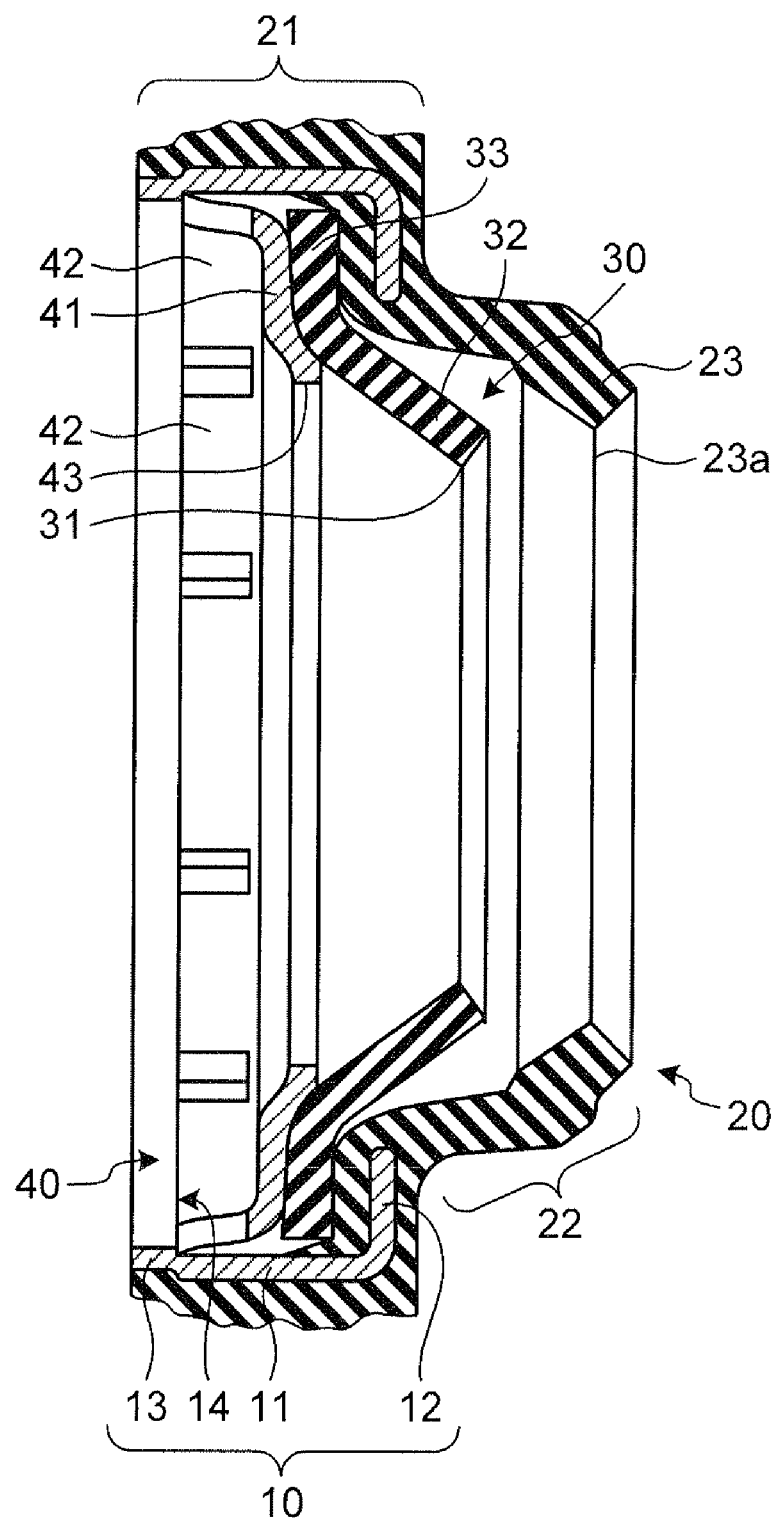
FIG. 1 is a sectional side view illustrating a sealing device according to a first embodiment of the invention.

10 Reinforcing ring
11 Mounting portion

13 Engagement portion
20 Exterior sealing member
21 Fitting portion
22 Sealing lip portion
30 Auxiliary sealing member
40 Retainer
41 Pinching portion
42 Elastic tongue piece
42a Circumscribed circle
140 Retainer
141 Pinching portion
142 Elastic tongue piece
142d Circumscribed circle
210 Reinforcing ring
211 Mounting portion
213 Elastic protrusion
213a Inscribed circle
220 Exterior sealing member
221 Fitting portion
222 Sealing lip portion
230 Auxiliary sealing member
240 Retainer
241 Pinching portion
242 Inner cylinder portion
A Housing
B Housing hole
C Rotating shaft

BEST MODE(S) FOR CARRYING OUT THE INVENTION

A sealing device according to a preferred embodiment of the invention will be described in detail below with reference to the accompanying drawings.

First Embodiment

Figure 2:
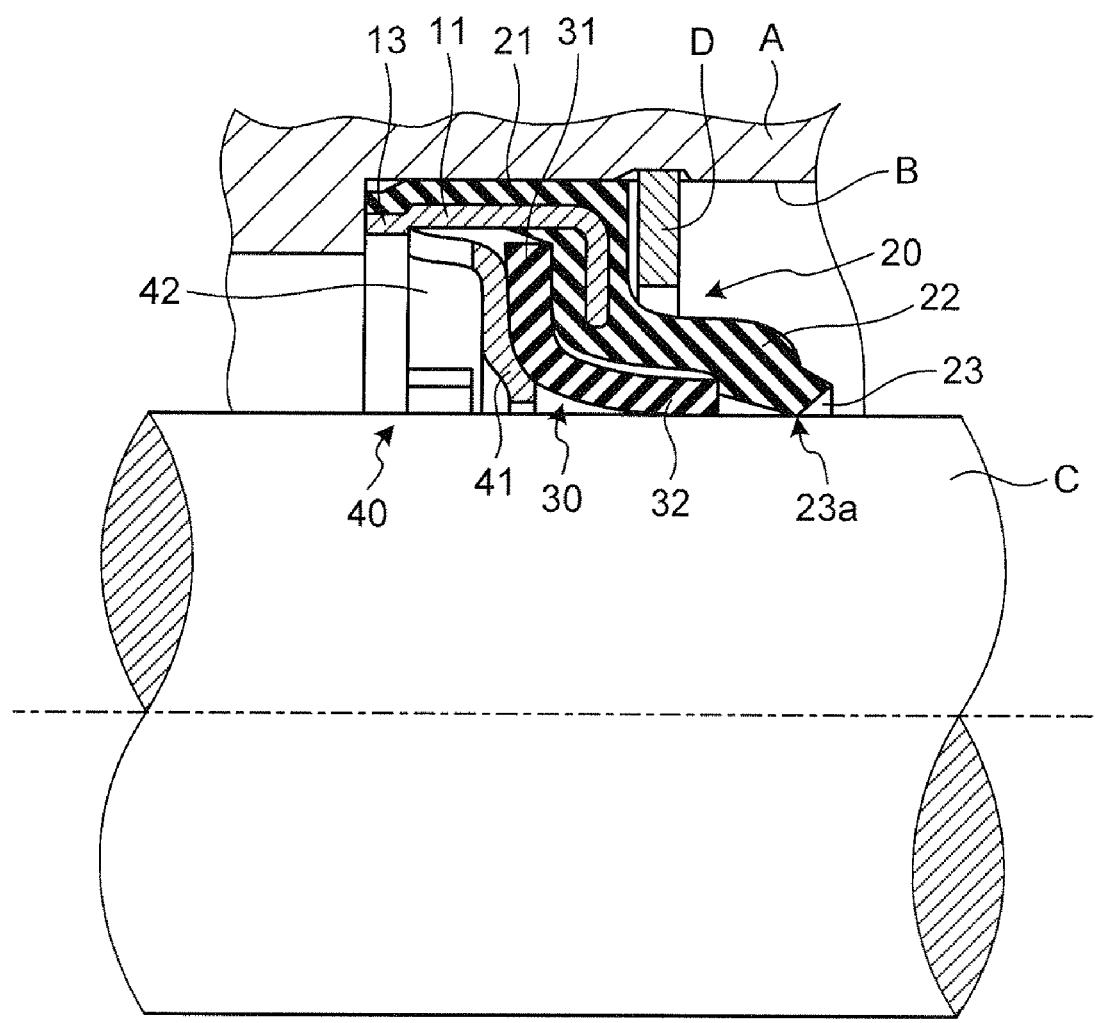
FIG. 2 is a sectional side view illustrating an upper half of a bearing portion to which the sealing device of FIG. 1 is applied.
Figure 3:
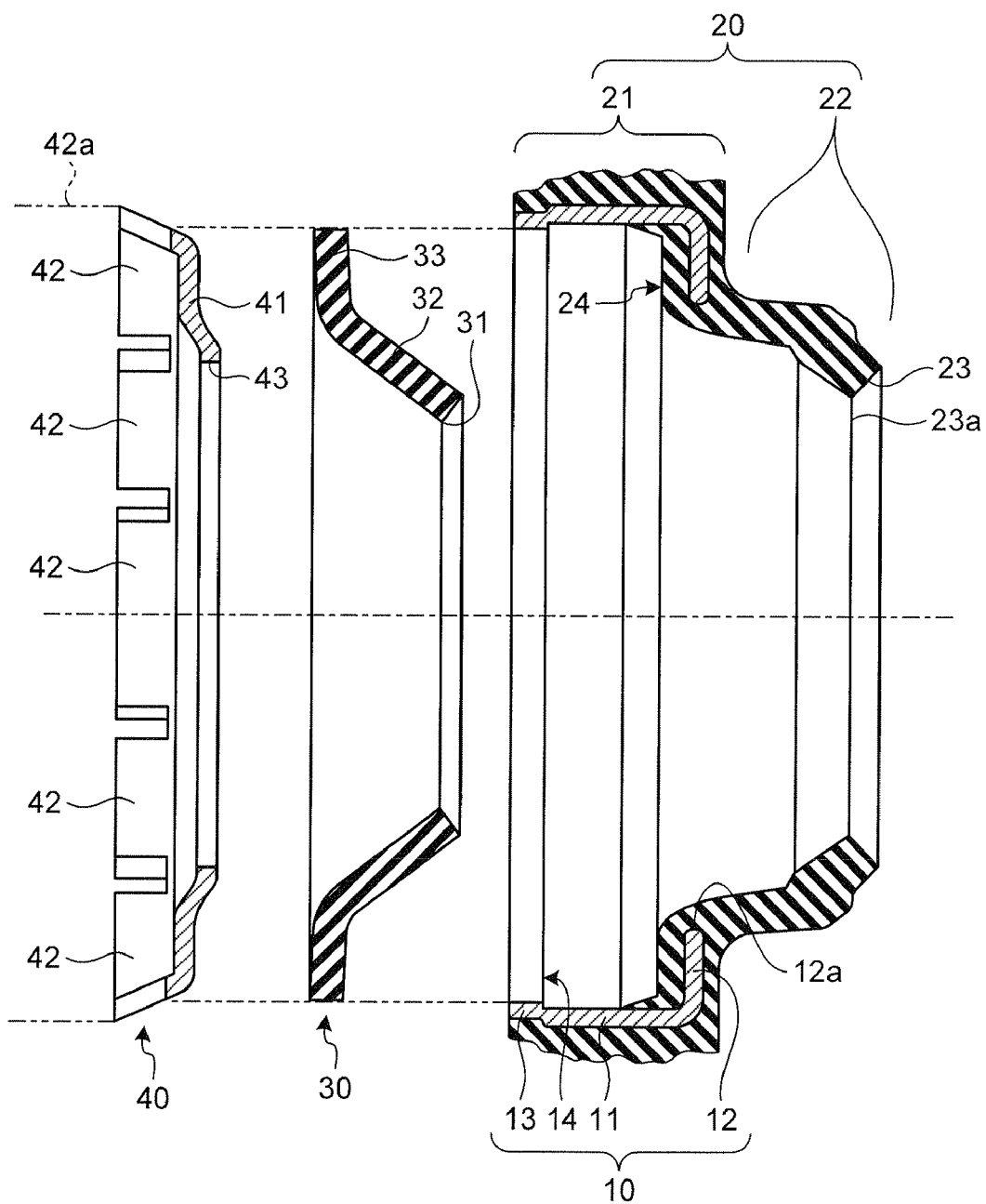
FIG. 3 is an exploded sectional side view of the sealing device of FIG. 1.

FIG. 1 illustrates a sealing device according to a first embodiment of the invention. As illustrated in FIG. 2, the sealing device is interposed between a rotating shaft C and a housing hole B formed in a housing A to prevent the leakage of the fluid, such as the refrigerant gas and the refrigerating machine oil, enclosed in the housing A (the right side in FIG. 2), to the outside of the housing A (the left side in FIG. 2) through the gap between the housing A and the rotating shaft C in a car air-conditioner compressor. As illustrated in FIGS. 1 to 3, the sealing device includes a reinforcing ring 10, an exterior sealing member 20, an auxiliary sealing member 30, and a retainer 40.

The reinforcing ring 10 includes a mounting portion 11, a pinching base portion 12, and an engagement portion 13. The mounting portion 11 is formed into a cylindrical shape. The mounting portion 11 has an inside diameter that is larger than an outside diameter of the rotating shaft C, and the mounting portion 11 has an outside diameter that is smaller than an inside diameter of the housing hole B. The pinching base portion 12 is bent at a substantially right angle toward a shaft center direction from one end portion of the mounting portion 11. A through hole 12a having an inside diameter that is larger than the outside diameter of the rotating shaft C is formed in a central portion of the pinching base portion 12. The engagement portion 13 is a cylindrical portion that is provided in the other end portion of the mounting portion 11. The engagement portion 13 has an inside diameter that is smaller than the inside diameter of the mounting portion 11. The engagement portion 13 is provided adjacent to the mounting portion 11, and an annular engagement surface 14 is formed between the engagement portion 13 and the mounting portion 11. The mounting portion 11, the pinching base portion 12, and the engagement portion 13 are integrally formed of metal. The mounting portion 11, the pinching base portion 12, and the engagement portion 13 have rigidity that is higher than that of an exterior sealing member 20 and an auxiliary sealing member 30 described below.

The exterior sealing member 20 is molded using an elastomer. The exterior sealing member 20 includes a fitting portion 21 and a sealing lip portion 22. The fitting portion 21 is provided such that an outer circumference of the reinforcing ring 10 is covered therewith. The sealing lip portion 22 is extended from one end portion of the reinforcing ring 10.

A region over an outer circumference surface of the engagement portion 13 and an outer circumference surface of the mounting portion 11 of the reinforcing ring 10 is covered with the fitting portion 21. A region from an outside surface of the pinching base portion 12 to an inside surface of the pinching base portion 12 is covered with the fitting portion 21. In a no-load state, the fitting portion 21 has an outside diameter that is larger than the inside diameter of the housing hole B formed in the housing A. The fitting portion 21 can be inserted in the housing hole B of the housing A when elastically deformed.

The sealing lip portion 22 is a cylindrical portion that is extended along the shaft center direction of the mounting portion 11 from an inner end portion of the pinching base portion 12 of the reinforcing ring 10. As can be seen from FIGS. 1 to 3, a lip leading end 23 is formed in an inner circumference surface of the extended end portion of the sealing lip portion 22. The lip leading end 23 is an annular portion that is protruded at a substantially right angle toward a center axis direction from the extended end portion of the sealing lip portion 22. An inside diameter of a ridge line 23a of the lip leading end 23 is smaller than an outside diameter of the rotating shaft C.

The exterior sealing member 20 including the fitting portion 21 and the sealing lip portion 22 is integrally formed with the reinforcing ring 10 by adhesion means such as curing adhesion. More specifically, the exterior sealing member 20 and the reinforcing ring 10 are integrally formed while one end portion of the mounting portion 11 of the reinforcing ring 10 and the pinching base portion 12 are buried in the fitting portion 21 of the exterior sealing member 20. The inner circumference surface on the other end portion of the mounting portion 11 of the reinforcing ring 10 and the inner circumference surface of the engagement portion 13 are exteriorly exposed and are not covered with the exterior sealing member 20.

The auxiliary sealing member 30 includes a cylindrical sealing lip portion 32 and a flange portion 33 that are integrally molded using a synthetic resin material having rigidity that is higher than that of the elastomer. The sealing lip portion 32 has a center hole 31 in one end portion, which has an inside diameter that is smaller than the outside diameter of the rotating shaft C. The diameter of the sealing lip portion 32 is gradually increased toward the other end portion side. The flange portion 33 is extended outward in the radial direction from the largest diameter portion in the sealing lip portion 32. An outside diameter of the flange portion 33 is smaller than the inside diameter of the mounting portion 11 of the reinforcing ring 10. The outside diameter of the flange portion 33 is larger than the inside diameter of the through hole 12a formed in the pinching base portion 12. A length from one end face portion of the sealing lip portion 32 to the flange portion 33 in the auxiliary sealing member 30 is smaller than a distance between the lip leading end 23 of the sealing lip portion 22 and an internal abutment end face 24 of the exterior sealing member 20. The internal abutment end face 24 covers the inside surface of the pinching base portion 12.

As illustrated in FIG. 1, the auxiliary sealing member 30 is mounted in the mounting portion 11 of the reinforcing ring 10 in such a state that the sealing lip portion 32 is disposed in the sealing lip portion 22 of the exterior sealing member 20 and the flange portion 33 abuts on the internal abutment end face 24.

Figure 4:
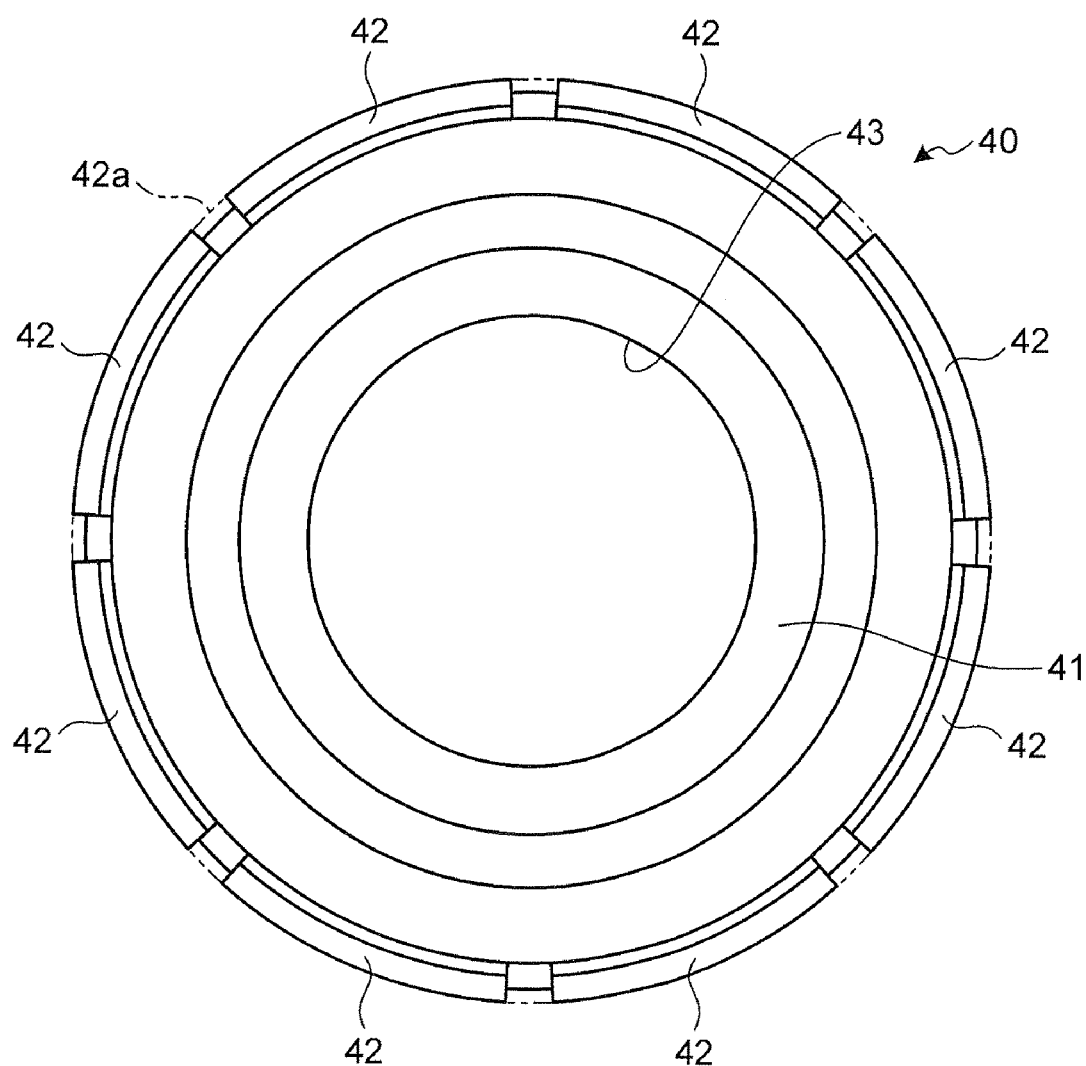
FIG. 4 illustrates an internal mounting member applied to the sealing device of FIG. 1 when the internal mounting member is viewed from an elastic tongue piece side.

As illustrated in FIGS. 1, 3, and 4, the retainer 40 is mounted in the mounting portion 11 of the reinforcing ring 10. The retainer 40 includes a pinching portion 41 and plural elastic tongue pieces 42. The pinching portion 41 is formed into a substantially circular disk shape having an outside diameter that is smaller than the inside diameter of the engagement portion 13 in the reinforcing ring 10. The pinching portion 41 has a through hole 43 in the central portion thereof, and the through hole 43 has a diameter that is larger than an outside diameter of the rotating shaft C. The elastic tongue pieces 42 are extended along the shaft center direction from an outer circumference edge portion of the pinching portion 41 while gradually inclined outward. As is clear from FIGS. 3 and 4, for each elastic tongue piece 42 in a no-load state, a circumscribed circle 42a defined by each extended end portion is larger than the inside diameter of the engagement portion 13 of the reinforcing ring 10. A length extended in the shaft center direction of the elastic tongue piece 42 is larger than a distance from the end face of the flange portion 33 in the auxiliary sealing member 30 to the engagement surface 14 formed between the mounting portion 11 and the engagement portion 13 in the reinforcing ring 10. The pinching portion 41 and the plural elastic tongue pieces 42 are integrally formed of metal, and the pinching portion 41 and the plural elastic tongue pieces 42 have the rigidity that is higher than that of the exterior sealing member 20 and the auxiliary sealing member 30.

The retainer 40 configured as described above is mounted in the reinforcing ring 10 after the auxiliary sealing member 30 is accommodated in the reinforcing ring 10, whereby the retainer 40 pinches and retains the flange portion 33 of the auxiliary sealing member 30 between the pinching portion 41 and the pinching base portion 12 of the reinforcing ring 10.

Figure 5:
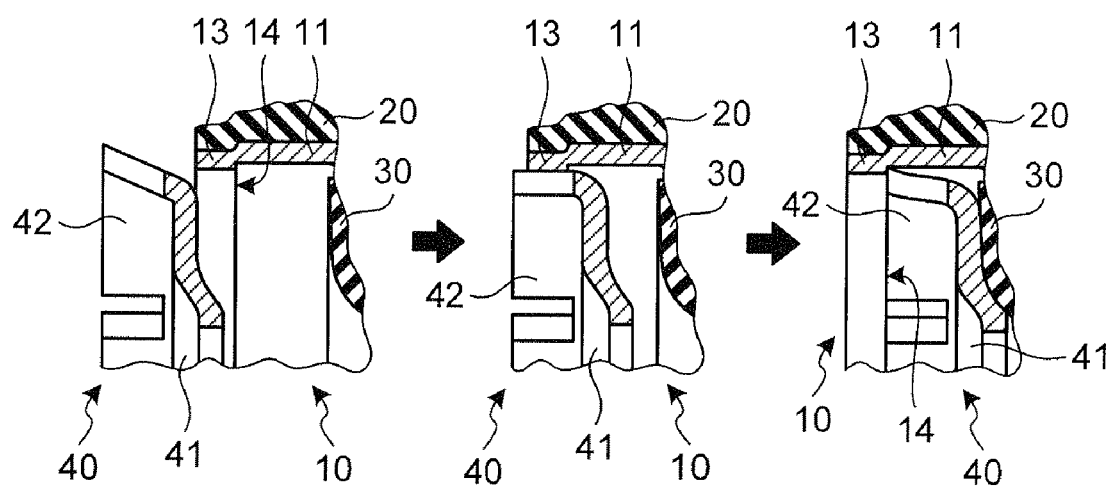
FIG. 5 is a sectional side view illustrating a process for assembling the sealing device of FIG. 1.

In the above-described sealing device, the engagement portion 13 is formed at the opening end portion of the mounting portion 11 of the reinforcing ring 10. The elastic tongue pieces 42 are provided in the retainer 40 such that the circumscribed circle 42a in the no-load state becomes larger than the inside diameter of the engagement portion 13. Accordingly, in mounting the retainer 40 in the reinforcing ring 10, the retainer 40 may simply be pushed from the engagement portion 13 into the mounting portion 11 of the reinforcing ring 10 as illustrated in FIG. 5. When the retainer 40 is pushed into the engagement portion 13 of the reinforcing ring 10, the elastic tongue pieces 42 deform elastically inward, and the circumscribed circle 42a defined by each extended end portion becomes equal to or smaller than the inside diameter of the engagement portion 13 of the reinforcing ring 10, so that the retainer 40 can be inserted in the mounting portion 11 through the inside of the engagement portion 13. When the retainer 40 is pushed into the reinforcing ring 10, the elastic tongue pieces 42 are elastically restored to expand once the extended end of the elastic tongue pieces 42 pass through the engagement surface 14, and each end face engages the engagement surface 14. Therefore, the retainer 40 is prevented from dropping out of the mounting portion 11.

At this point, the flange portion 33 of the auxiliary sealing member 30 is pinched and retained between the pinching portion 41 of the retainer 40 and the pinching base portion 12 of the reinforcing ring 10 while the exterior sealing member 20 is interposed therebetween. Thus, the position of the auxiliary sealing member 30 can securely be prevented from deviating from the reinforcing ring 10.

As illustrated in FIG. 2, the sealing device is mounted in the housing hole B while the sealing lip portion 22 of the exterior sealing member 20 is orientated inward of the housing A, and the rotating shaft C of the compressor is inserted and disposed in the central portion. Therefore, the gap between the housing hole B of the housing A and the rotating shaft C of the compressor is securely sealed by the exterior sealing member 20 and the auxiliary sealing member 30. That is, the reinforcing ring 10 presses the outer circumference portion of the fitting portion 21 of the exterior sealing member 20 against the inner circumference surface of the housing hole B. The sealing lip portion 22 of the exterior sealing member 20 is pressed against the outer circumference surface of the rotating shaft C while the ridge line 23a of the lip leading end 23 is interposed therebetween. Furthermore, the inner circumference surface of the sealing lip portion 32 of the auxiliary sealing member 30 is pressed against the outer circumference surface of the rotating shaft C. The leading end portion of the sealing lip portion 22 of the exterior sealing member 20 is supported from the inner circumference side by the sealing lip portion 32.

Therefore, in the compressor to which the sealing device of the first embodiment is applied, the leakage of the fluid, such as the refrigerant gas and the refrigerating machine oil, from the inside of the housing A to the outside can be prevented even if the rotating shaft C is rotated. In FIG. 2, the reference numeral D denotes a retaining ring.

In the sealing device of the first embodiment, the position deviation of the auxiliary sealing member 30 with respect to the reinforcing ring 10 is securely prevented without requiring additional components, so that the degradation of the sealing effect can effectively be prevented without requiring the increased production cost caused by the increased number of components. Additionally, the engagement portion 13 of the reinforcing ring 10 and the elastic tongue pieces 42 of the retainer 40 can previously be formed before the engagement portion 13 and the elastic tongue pieces 42 are assembled. In assembling the sealing device, the retainer 40 may simply be pushed in the mounting portion 11 of the reinforcing ring 10 in which the auxiliary sealing member 30 is accommodated. As a result, the assembling work can be facilitated, and the necessity of the caulking process is eliminated. Therefore, the increase of the production cost due to the increased number of assembling processes can be eliminated.

Second Embodiment

Figure 6:
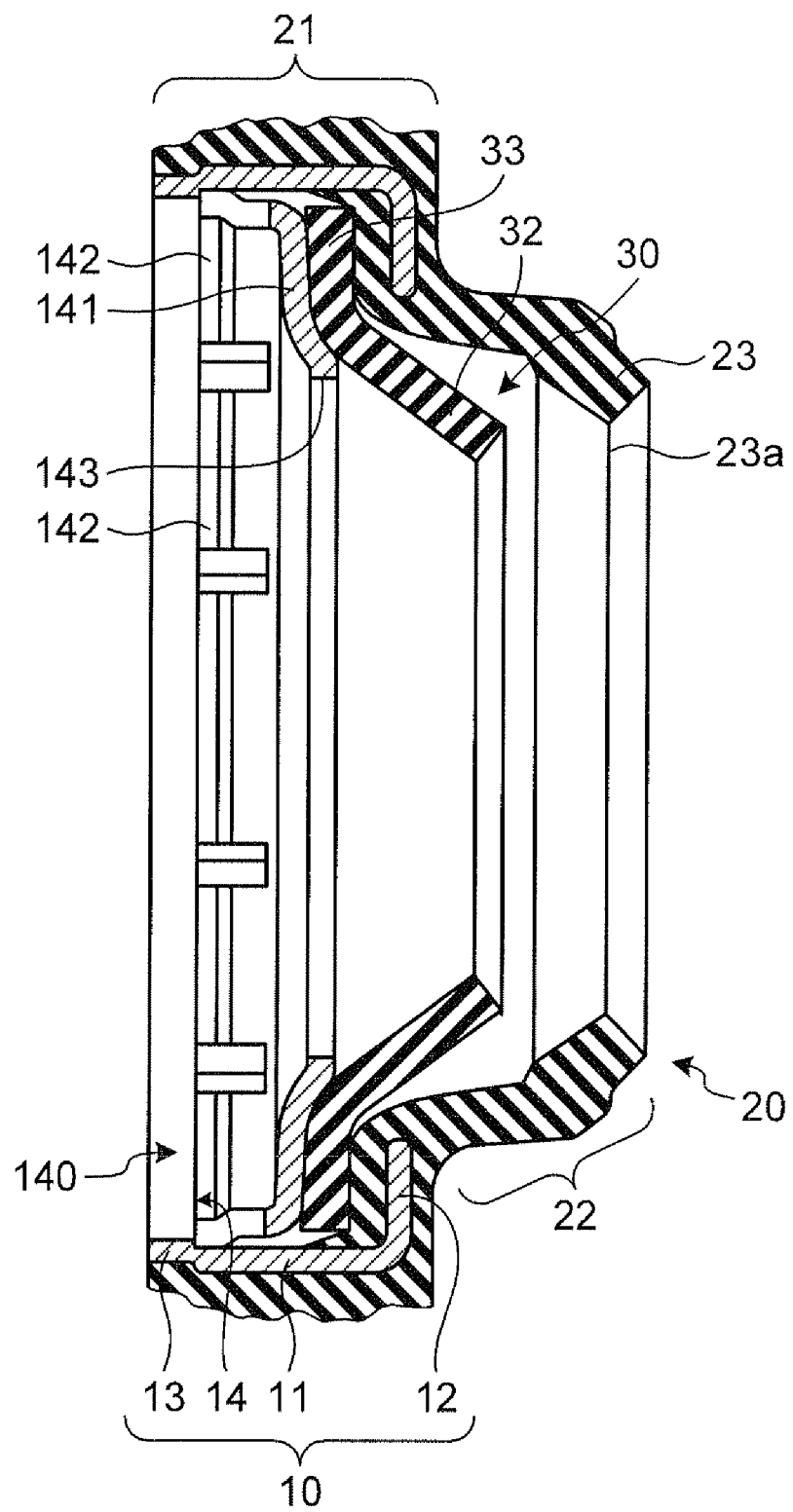
FIG. 6 is a sectional side view illustrating a sealing device according to a second embodiment of the invention.
Figure 7:
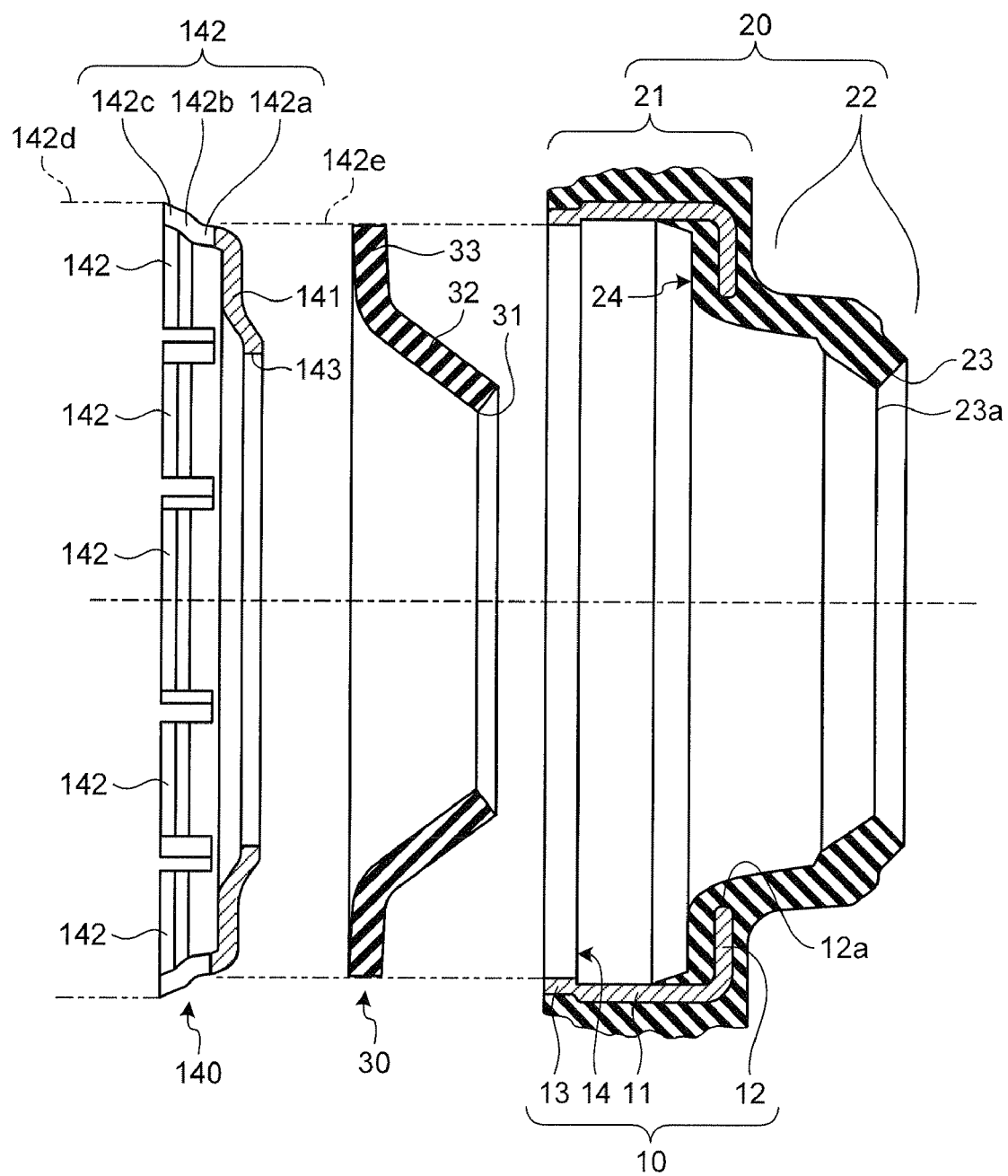
FIG. 7 is an exploded sectional side view of the sealing device of FIG. 6.

FIGS. 6 and 7 illustrate a sealing device according to a second embodiment of the invention. As with the sealing device of the first embodiment, the sealing device of the second embodiment is interposed between the rotating shaft C and the housing hole B formed in the housing A to prevent the leakage of the fluid, such as the refrigerant gas and the refrigerating machine oil, enclosed in the housing A, to the outside of the housing A through the gap between the housing A and the rotating shaft C in the car air-conditioner compressor. The sealing device of the second embodiment differs from the sealing device of the first embodiment only in the configuration of the retainer. The configuration of a retainer 140 of the second embodiment will mainly be described below. In the second embodiment, the configuration similar to that of the first embodiment is denoted by the same reference numeral, and the detailed description is not repeated here.

The retainer 140 used in the sealing device of the second embodiment is mounted in the mounting portion 11 of the reinforcing ring 10. The retainer 140 includes a pinching portion 141 and plural elastic tongue pieces 142. The pinching portion 141 is formed into a substantially circular disk shape having an outside diameter that is smaller than the inside diameter of the engagement portion 13 of the reinforcing ring 10. A through hole 143 is formed in the central portion of the pinching portion 141, and the through hole 143 is larger than the rotating shaft C. The elastic tongue pieces 142 are extended toward the same direction from an outer circumference edge portion of the pinching portion 141. Each elastic tongue piece 142 includes a cylindrically extended portion 142a, an obliquely extended portion 142b, and an engagement end-face portion 142c. The cylindrically extended portions 142a are extended in parallel with one another along the shaft center direction from the outer circumference edge portion of the pinching portion 141. The obliquely extended portion 142b is extended along the shaft center direction while gradually inclined outward. The engagement end-face portion 142c is extended from the extended end portion of the obliquely extended portion 142b along the shaft center direction toward the inside.

Each elastic tongue piece 142 is formed such that a circumscribed circle 142d defined by each engagement end-face portion 142c is larger than the inside diameter of the engagement portion 13 of the reinforcing ring 10 when each elastic tongue piece 142 is in the no-load state. In contrast, a circumscribed circle 142e defined by the individual cylindrically extended portion 142a is substantially equal to the outside diameter of the pinching portion 141, and the circumscribed circle 142e is smaller than the inside diameter of the engagement portion 13 of the reinforcing ring 10. A length in which the elastic tongue piece 142 is extended along the axial direction is longer than a distance between the end face of the flange portion 33 of the auxiliary sealing member 30 and the engagement surface 14 that is formed between the mounting portion 11 and the engagement portion 13 of the reinforcing ring 10. The pinching portion 141 and the plural elastic tongue pieces 142 are integrally formed of metal. The pinching portion 141 and the elastic tongue pieces 142 have the rigidity that is higher than that of the exterior sealing member 20 and the auxiliary sealing member 30.

The retainer 140 configured as described above is mounted in the reinforcing ring 10 after the auxiliary sealing member 30 is accommodated in the reinforcing ring 10, whereby the retainer 140 pinches and retains the flange portion 33 of the auxiliary sealing member 30 between the pinching portion 141 of the retainer 140 and the pinching base portion 12 of the reinforcing ring 10.

In the above-described sealing device, the engagement portion 13 is formed at the opening end portion of the mounting portion 11 of the reinforcing ring 10. The elastic tongue pieces 142 are provided in the retainer 140 such that the circumscribed circle 142d in the no-load state becomes larger than the inside diameter of the engagement portion 13. Accordingly, in mounting the retainer 140 in the reinforcing ring 10, the retainer 140 may simply be pushed from the engagement portion 13 into the mounting portion 11 of the reinforcing ring 10. When the retainer 140 is pushed into the engagement portion 13, the elastic tongue pieces 142 deform elastically inward, and the circumscribed circle 142d defined by each extended end portion becomes equal to or smaller than the inside diameter of the engagement portion 13 of the reinforcing ring 10, so that the retainer 140 can be inserted in the mounting portion 11 through the inside of the engagement portion 13. When the retainer 140 is then pushed into the reinforcing ring 10, the elastic tongue pieces 142 are elastically restored to expand once the end face of the engagement end-face portion 142c of the elastic tongue piece 142 passes through the engagement surface 14, and each end face engages the engagement surface 14. Therefore, the retainer 140 is prevented from dropping out of the mounting portion 11.

In the sealing device of the second embodiment, the cylindrically extended portions 142a are provided in the base end portions of the elastic tongue pieces 142 so as to be extended along the shaft center direction. The circumscribed circle 142e defined by the cylindrically extended portions 142a is smaller than the inside diameter of the mounting portion 11 of the reinforcing ring 10. Accordingly, the cylindrically extended portions 142a act as a guide when the retainer 140 is pushed into the reinforcing ring 10, which further facilitates the work for assembling the retainer 140 in the reinforcing ring 10.

Additionally, at this point, the flange portion 33 of the auxiliary sealing member 30 is pinched and retained between the pinching portion 141 of the retainer 140 and the pinching base portion 12 of the reinforcing ring 10 while the exterior sealing member 20 is interposed therebetween. Thus, the position of the auxiliary sealing member 30 can securely be prevented from deviating from the reinforcing ring 10.

As with the sealing device illustrated in FIG. 2 of the first embodiment, the sealing device of the second embodiment is mounted in the housing hole B while the sealing lip portion 22 of the exterior sealing member 20 is orientated inward of the housing A, and the rotating shaft C of the compressor is inserted and disposed in the central portion. Therefore, the gap between the housing hole B of the housing A and the rotating shaft C of the compressor is securely sealed by the exterior sealing member 20 and the auxiliary sealing member 30. That is, the reinforcing ring 10 presses the outer circumference portion of the fitting portion 21 of the exterior sealing member 20 against the inner circumference surface of the housing hole B. The sealing lip portion 22 of the exterior sealing member 20 is pressed against the outer circumference surface of the rotating shaft C while the ridge line 23a of the lip leading end 23 is interposed therebetween. Furthermore, the inner circumference surface of the sealing lip portion 32 of the auxiliary sealing member 30 is pressed against the outer circumference surface of the rotating shaft C. The leading end portion of the sealing lip portion 22 of the exterior sealing member 20 is supported from the inner circumference side by the sealing lip portion 32.

Therefore, in the compressor to which the sealing device of the second embodiment is applied, the leakage of the fluid, such as the refrigerant gas and the refrigerating machine oil, from the inside of the housing A to the outside can be prevented even if the rotating shaft C is rotated.

In the sealing device of the second embodiment, the position deviation of the auxiliary sealing member 30 with respect to the reinforcing ring 10 is securely prevented without requiring additional components, so that the degradation of the sealing effect can effectively be prevented without requiring the increased production cost caused by the increased number of components. Additionally, the engagement portion 13 of the reinforcing ring 10 and the elastic tongue pieces 142 of the retainer 140 can previously be formed before the engagement portion 13 and the elastic tongue pieces 142 are assembled. In assembling the sealing device, the retainer 140 may simply be pushed into the mounting portion 11 of the reinforcing ring 10 in which the auxiliary sealing member 30 is accommodated. As a result, the assembling work can be facilitated, and the necessity of the caulking process is eliminated. Therefore, the increase of the production cost due to the increased number of assembling processes can be eliminated.

Third Embodiment

Figure 8:
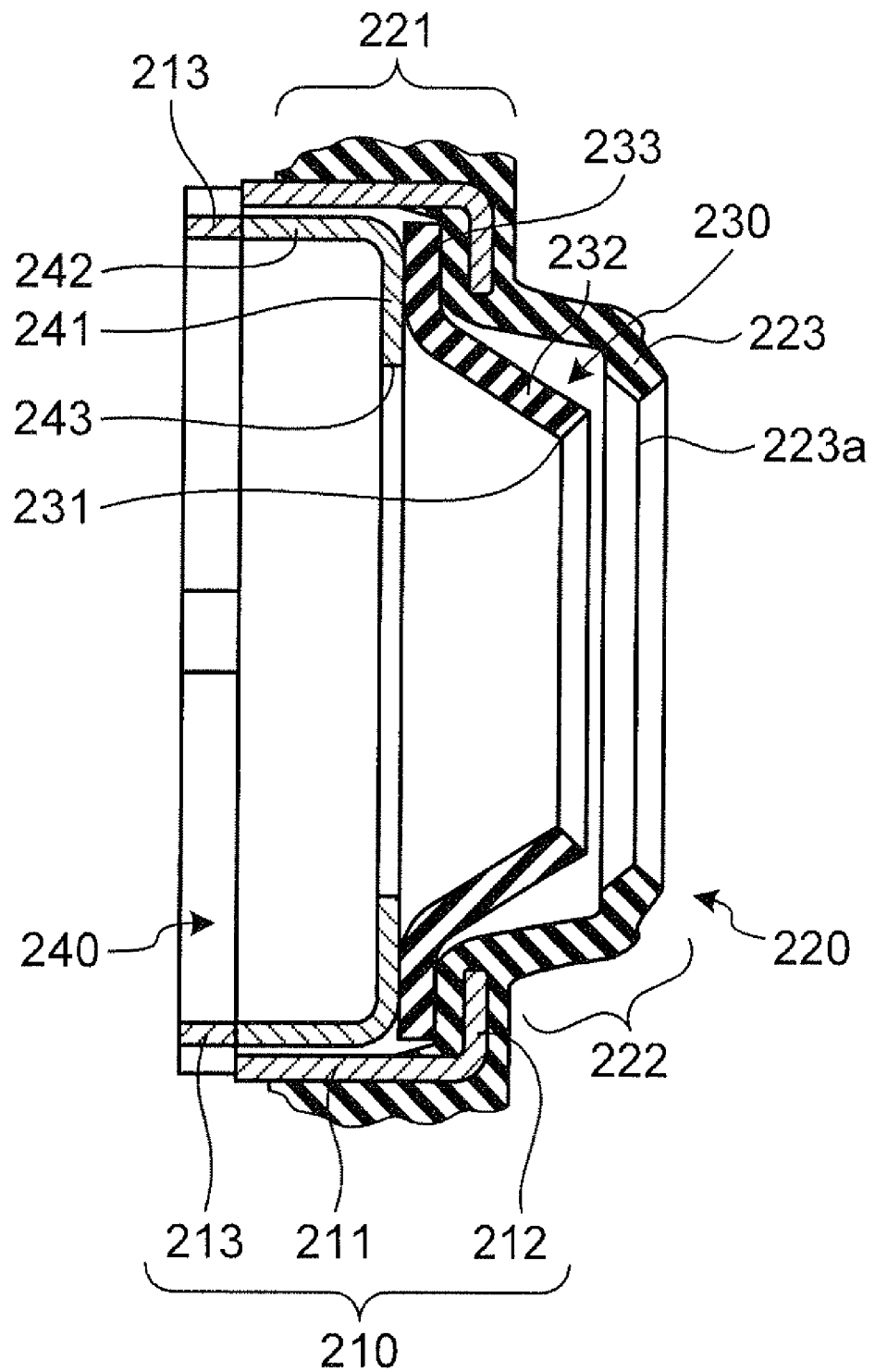
FIG. 8 is a sectional side view illustrating a sealing device according to a third embodiment of the invention.
Figure 9:
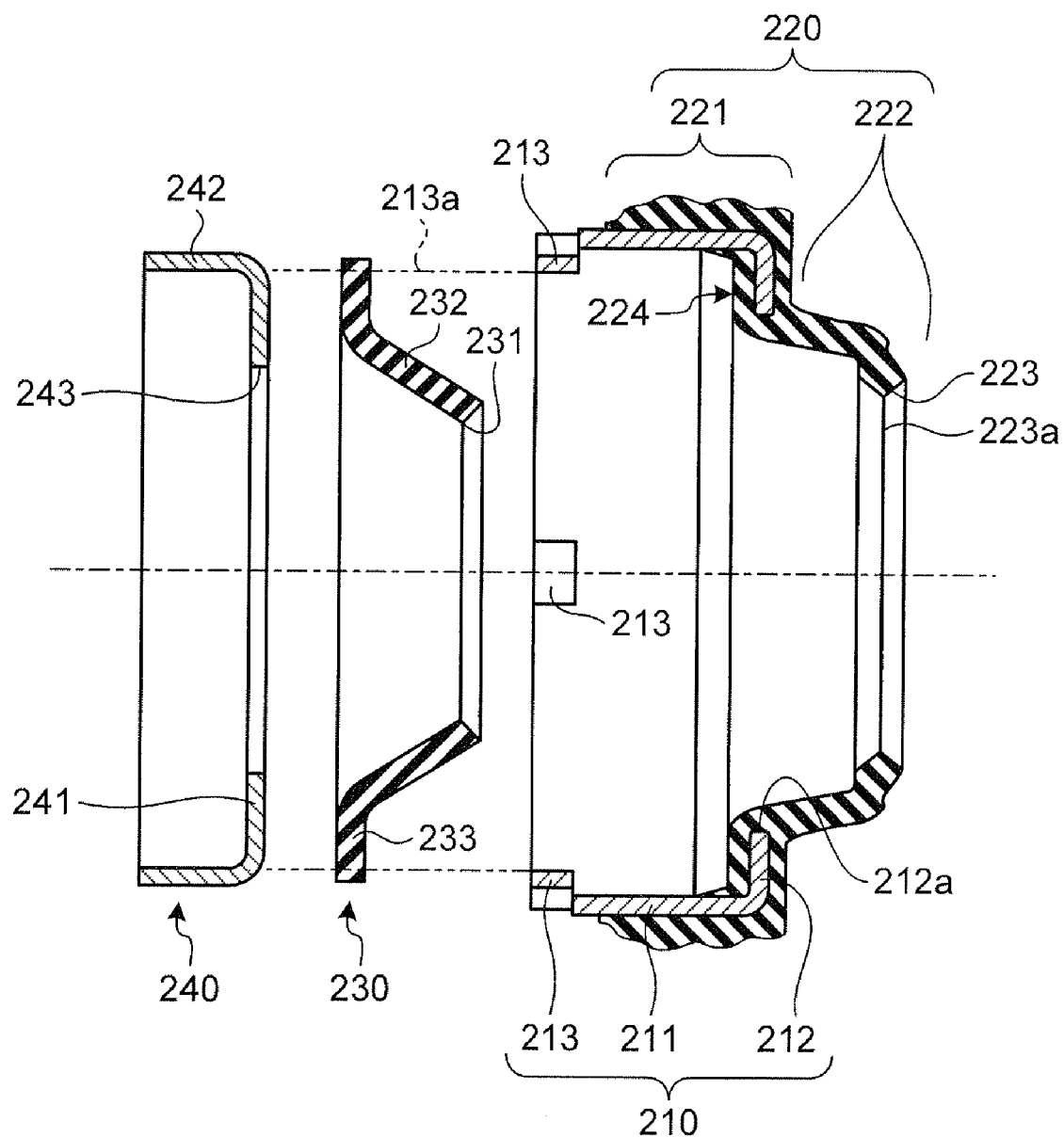
FIG. 9 is an exploded sectional side view of the sealing device of FIG. 8.

FIG. 8 illustrates a sealing device according to a third embodiment of the invention. As with the sealing device of the first embodiment, the sealing device of the third embodiment is interposed between the rotating shaft C and the housing hole B formed in the housing A to prevent the leakage of the fluid, such as the refrigerant gas and the refrigerating machine oil, enclosed in the housing A, to the outside of the housing A through the gap between the housing A and the rotating shaft C in the car air-conditioner compressor. As illustrated in FIGS. 8 and 9, the sealing device includes a reinforcing ring 210, an exterior sealing member 220, an auxiliary sealing member 230, and a retainer 240.

The reinforcing ring 210 includes a mounting portion 211 and a pinching base portion 212. The mounting portion 211 is formed into a cylindrical shape. The mounting portion 211 has an inside diameter that is larger than the outside diameter of the rotating shaft C, and the mounting portion 211 has an outside diameter that is smaller than the inside diameter of the housing hole B. The pinching base portion 212 is bent at a substantially right angle toward the shaft center direction from one end portion of the mounting portion 211. A through hole 212a having an inside diameter that is larger than the outside diameter of the rotating shaft C is formed in the central portion of the pinching base portion 212. The mounting portion 211 and the pinching base portion 212 are integrally formed of metal. The mounting portion 211 and the pinching base portion 212 have the rigidity that is higher than that of an exterior sealing member 220 and an auxiliary sealing member 230 described below.

The exterior sealing member 220 is molded using an elastomer. The exterior sealing member 220 includes a fitting portion 221 and a sealing lip portion 222. The fitting portion 221 is provided such that the reinforcing ring 210 is covered therewith. The sealing lip portion 222 is extended from one end portion of the reinforcing ring 210.

An outer circumference surface of the mounting portion 211 of the reinforcing ring 210 is covered with the fitting portion 221. A region from an outside surface of the pinching base portion 212 to an inside surface of the pinching base portion 212 is covered with the fitting portion 221. In the no-load state, the fitting portion 221 has an outside diameter that is larger than the inside diameter of the housing hole B formed in the housing A. The fitting portion 221 can be inserted in the housing hole B of the housing A when elastically deformed.

The sealing lip portion 222 is a cylindrical portion that is extended along the shaft center direction of the mounting portion 211 from an inner end portion of the pinching base portion 212 in the reinforcing ring 210. As can be seen from FIGS. 8 and 9, a lip leading end 223 is formed in an inner circumference surface of the extended end portion of the sealing lip portion 222. The lip leading end 223 is an annular portion that is protruded at a substantially right angle toward a center axis direction from the extended end portion of the sealing lip portion 222. An inside diameter of a ridge line 223a of the lip leading end 223 is smaller than the outside diameter of the rotating shaft C.

The exterior sealing member 220 including the fitting portion 221 and the sealing lip portion 222 is integrally formed with the reinforcing ring 210 by adhesion means such as curing adhesion. More specifically, the exterior sealing member 220 and the reinforcing ring 210 are integrally formed while one end portion of the mounting portion 211 in the reinforcing ring 210 and the pinching base portion 212 are buried in the fitting portion 221 in the exterior sealing member 220. The inner circumference surface in the other end portion of the mounting portion 211 in the reinforcing ring 210 is exteriorly exposed and not covered with the exterior sealing member 220.

The auxiliary sealing member 230 includes a cylindrical sealing lip portion 232 and a flange portion 233 that are integrally molded using a synthetic resin material having the rigidity that is higher than that of the elastomer. The sealing lip portion 232 has a center hole 231 in one end portion, which has an inside diameter that is smaller than the outside diameter of the rotating shaft C. The diameter of the sealing lip portion 232 is gradually increased toward the other end portion side. The flange portion 233 is extended outward in the radial direction from the largest diameter portion in the sealing lip portion 232. An outside diameter of the flange portion 233 is smaller than the inside diameter of the mounting portion 211 of the reinforcing ring 210. The outside diameter of the flange portion 233 is larger than the inside diameter of the through hole 212a formed in the pinching base portion 212. A length from one end face of the sealing lip portion 232 to the flange portion 233 in the auxiliary sealing member 230 is smaller than a distance between the lip leading end 223 of the sealing lip portion 222 and an internal abutment end face 224 of the exterior sealing member 220. The internal abutment end face 224 covers the inside surface of the pinching base portion 212 in the exterior sealing member 220.

As illustrated in FIG. 8, the auxiliary sealing member 230 is mounted in the mounting portion 211 of the reinforcing ring 210 in such a state that the sealing lip portion 232 is disposed in the sealing lip portion 222 of the exterior sealing member 220 while the flange portion 233 abuts on the internal abutment end face 224.

As illustrated in FIGS. 8 and 9, the retainer 240 is mounted in the mounting portion 211 of the reinforcing ring 210. The retainer 240 includes a pinching portion 241 and an inner cylinder portion 242. The pinching portion 241 is formed into a substantially circular disk shape having an outside diameter that is smaller than the inside diameter of the mounting portion 211 in the reinforcing ring 210. The pinching portion 241 has a through hole 243 in the central portion thereof, and the through hole 243 has a diameter that is larger than the outside diameter of the rotating shaft C. The inner cylinder portion 242 is a cylindrical portion extended along the shaft center direction from an outer circumference edge portion of the pinching portion 241. As with the outside diameter of the pinching portion 241, an outside diameter of the inner cylinder portion 242 is smaller than the inside diameter of the mounting portion 211 of the reinforcing ring 210. The pinching portion 241 and the inner cylinder portion 242 are integrally formed of metal. The pinching portion 241 and the inner cylinder portion 242 have the rigidity that is higher than that of the exterior sealing member 220 and the auxiliary sealing member 230.

Figure 10:
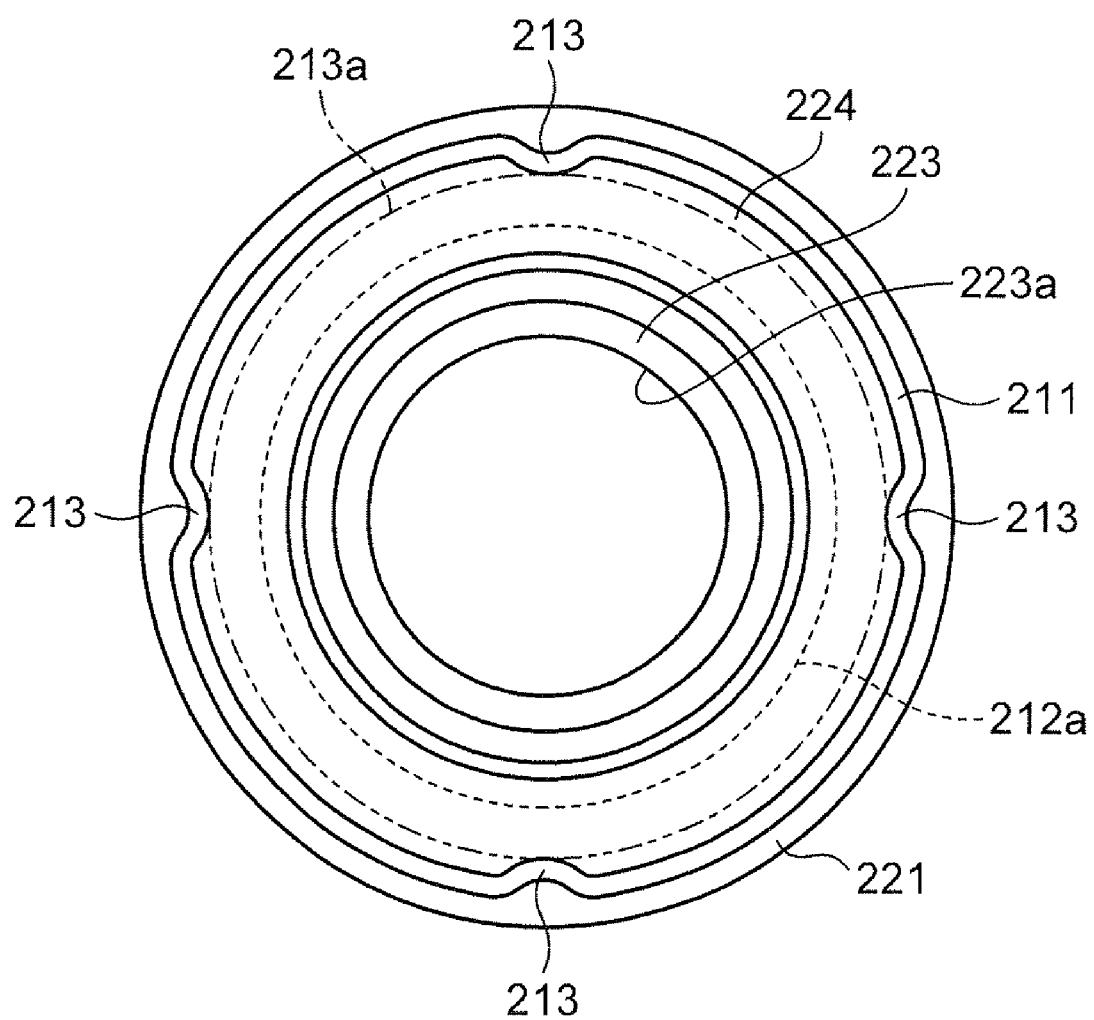
FIG. 10 illustrates a reinforcing ring applied to the sealing device of FIG. 8 when the reinforcing ring is viewed from the elastic protrusion side.

As illustrated in FIGS. 8 to 10, in the above-described sealing device, plural elastic protrusions 213 are provided in the other end portion of the mounting portion 211 of the reinforcing ring 210. The elastic protrusion 213 is embossed such that the outer circumference surface of the mounting portion 211 becomes concave while the inner circumference surface of the mounting portion 211 becomes convex. The elastic protrusions 213 are provided at equal intervals with each other in a circumferential direction of the mounting portion 211. In the third embodiment, four elastic protrusions 213 are provided so as to be 90 degrees away from each other. The end portions of the elastic protrusions 213, when the auxiliary sealing member 230 are mounted, are located such that a distance from the end portion of the elastic protrusion 213 on the inner side along the axial direction to the end face of the flange portion 233 is shorter than a length of the retainer 240 in the axial direction.

Each elastic protrusion 213 deforms elastically when an external force is applied from the inner circumference side toward the outer circumference side. When each elastic protrusion 213 is in the no-load state, an inscribed circle 213a defined by a portion that becomes convex on the inner circumference surface side of the mounting portion 211 becomes smaller than the outside diameter of the inner cylinder portion 242 of the retainer 240.

The retainer 240 is mounted in the reinforcing ring 210 after the auxiliary sealing member 230 is accommodated in the reinforcing ring 210, whereby the retainer 240 pinches and retains the flange portion 233 of the auxiliary sealing member 230 between the pinching portion 241 of the retainer 240 and the pinching base portion 212 of the reinforcing ring 210.

Figure 11:
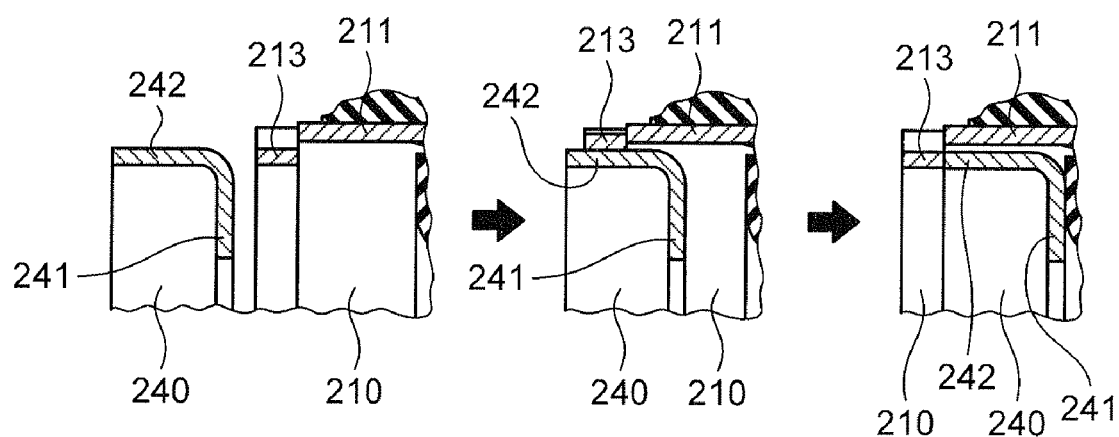
FIG. 11 is a sectional side view illustrating a process for assembling the sealing device of FIG. 8.
Figure 12:
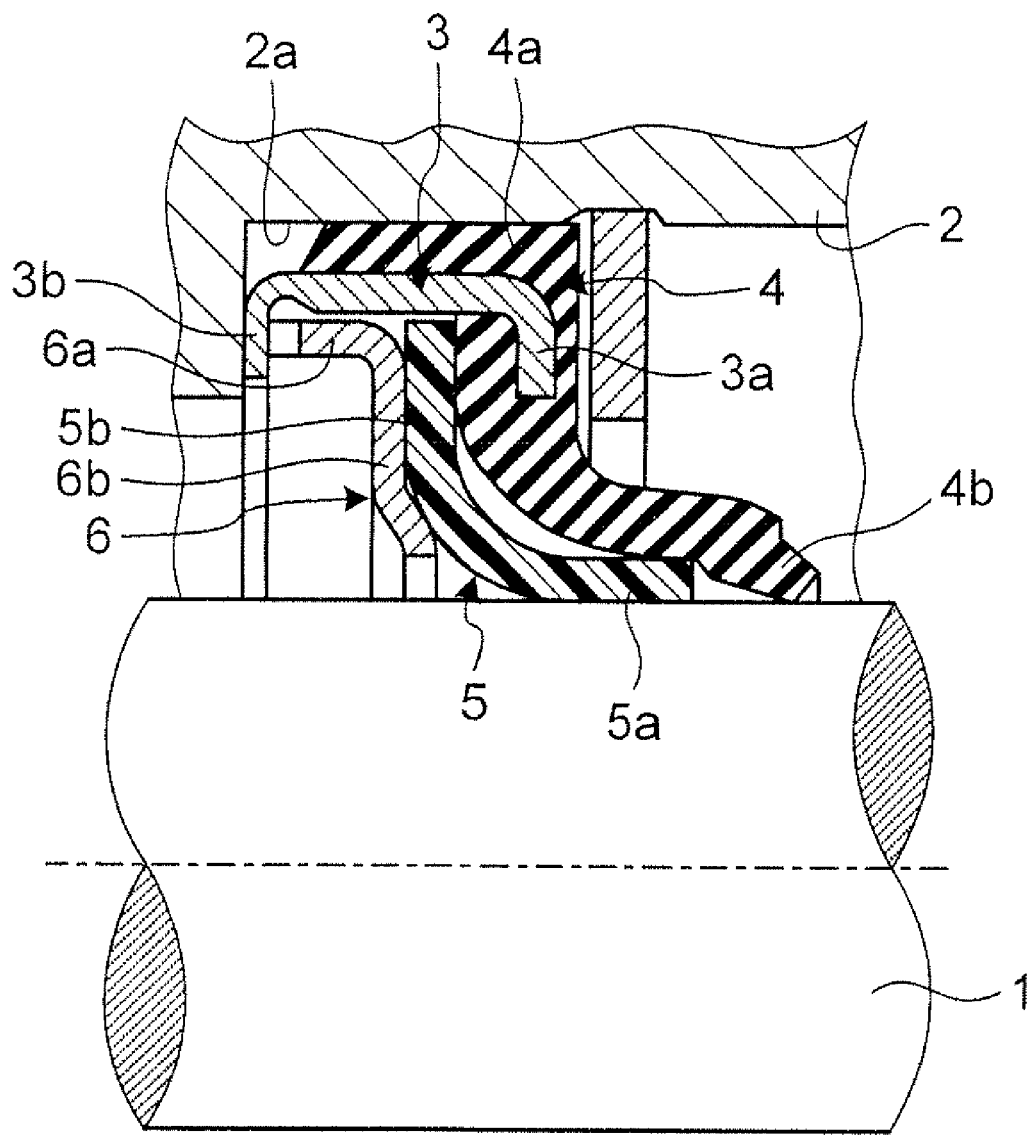
FIG. 12 is a sectional side view illustrating a conventional sealing device.

In the sealing device of the third embodiment, the elastic protrusions 213 are provided at the opening end portion of the mounting portion 211 of the reinforcing ring 210, the inscribed circle 213a in the no-load state is smaller than the outside diameter of the retainer 240. Accordingly, when the retainer 240 is mounted in the reinforcing ring 210, as illustrated in FIG. 11, the retainer 240 may simply be pushed into the mounting portion 211 of the reinforcing ring 210 from the opening end portion at which the elastic protrusions 213 are provided. When the retainer 240 is pushed into the mounting portion 211 of the reinforcing ring 210, the elastic protrusions 213 deform elastically toward the outer circumference direction by the external force applied from the inner cylinder portion 242 of the retainer 240, and the inscribed circle 213a defined by each convex portion becomes larger than the outside diameter of the inner cylinder portion 242 of the retainer 240. Therefore, the retainer 240 can be inserted in the mounting portion 211 through the elastic protrusions 213. When the retainer 240 is then further pushed into the reinforcing ring 210, the elastic protrusions 213 are elastically restored to shrink the diameter once the end face of the inner cylinder portion 242 passes through the end portions on the inner sides of the elastic protrusions 213, and the end portions on the backsides of the elastic protrusions 213 engage the end face of the inner cylinder portion 242, thereby preventing the retainer 240 from dropping out of the mounting portion 211.

At this point, the flange portion 233 of the auxiliary sealing member 230 is pinched and retained between the pinching portion 241 of the retainer 240 and the pinching base portion 212 of the reinforcing ring 210 while the exterior sealing member 220 is interposed therebetween. Thus, the position deviation of the auxiliary sealing member 230 with respect to the reinforcing ring 210 can securely be prevented.

As with the sealing device illustrated in FIG. 2 of the first embodiment, the sealing device of the third embodiment is mounted in the housing hole B while the sealing lip portion 222 of the exterior sealing member 220 is orientated inward of the housing A, and the rotating shaft C of the compressor is inserted and disposed in the central portion. Therefore, the gap between the housing hole B of the housing A and the rotating shaft C of the compressor is securely sealed by the exterior sealing member 220 and the auxiliary sealing member 230. That is, the reinforcing ring 210 presses the outer circumference portion of the fitting portion 221 of the exterior sealing member 220 against the inner circumference surface of the housing hole B. The sealing lip portion 222 of the exterior sealing member 220 is pressed against the outer circumference surface of the rotating shaft C while the ridge line 223a of the lip leading end 223 is interposed therebetween. Furthermore, the inner circumference surface of the sealing lip portion 232 of the auxiliary sealing member 230 is pressed against the outer circumference surface of the rotating shaft C. The leading end portion of the sealing lip portion 222 of the exterior sealing member 220 is supported from the inner circumference side by the sealing lip portion 232.

Therefore, in the compressor to which the sealing device of the third embodiment is applied, the leakage of the fluid, such as the refrigerant gas and the refrigerating machine oil, from the inside of the housing A to the outside can be prevented even if the rotating shaft C is rotated.

In the sealing device of the third embodiment, the position deviation of the auxiliary sealing member 230 with respect to the reinforcing ring 210 is securely prevented without requiring additional components, so that the degradation of the sealing effect can effectively be prevented without requiring the increased production cost caused by the increased number of components. Additionally, the elastic protrusions 213 of the reinforcing ring 210 can previously be formed before the retainer 240 is mounted therewith. In assembling the sealing device, the retainer 240 may simply be pushed into the mounting portion 211 of the reinforcing ring 210 in which the auxiliary sealing member 230 is accommodated. As a result, the assembling work can be facilitated, and the necessity of the caulking process is eliminated. Therefore, the increase of the production cost due to the increased number of assembling processes can be eliminated.

In the first to third embodiments, the sealing device is applied to the car air-conditioner compressor. However, obviously the sealing devices of the first to third embodiments may be applied to other applications as long as the sealing device is interposed between the bearing member and the shaft member. In such cases, it is not always necessary that the sealing device includes the exterior sealing member, the reinforcing ring, the retainer, and the auxiliary sealing member. For example, a metal pressure-proof backup ring may be interposed between the sealing lip portion of the exterior sealing member and the auxiliary sealing member.

In the first to third embodiments, the reinforcing ring and the retainer are formed of metal. Alternatively, the reinforcing ring and the retainer may be formed of other materials as long as the reinforcing ring and the retainer have the rigidity that is higher than that of the elastomer.

In the first to third embodiments, because the elastic engagement unit is formed at the opening end portion of the reinforcing ring, the engagement state of the elastic engagement unit can easily be confirmed from the outside. However, in the present invention, it is not always necessary to provide the elastic engagement unit at the opening end portion of the reinforcing ring. Alternatively, the elastic engagement unit may be formed so as to be engaged on the inner side of the reinforcing ring.

INDUSTRIAL APPLICABILITY

The invention is useful in the sealing device interposed between the housing hole and the shaft. The invention is suitable for the case in which the degradation of the sealing effect, caused by the position deviation of the auxiliary sealing member, is prevented without requiring the troublesome assembling work or the increased production cost.

The invention claimed is:

1. A sealing device comprising:
   an exterior sealing member that is annularly molded using an elastomer and includes a fitting portion and a sealing lip portion, the fitting portion being configured to be fitted in a housing hole, the sealing lip portion is configured to be pressed against an outer circumference surface of a shaft;
   a reinforcing ring that is formed into an annular shape and retains the fitting portion of the exterior sealing member in an outer circumference thereof, the reinforcing ring having a leading end portion from which the sealing lip portion of the exterior sealing member extends, the reinforcing ring being configured to be disposed in the housing hole to surround an outer circumference of the shaft and to press the fitting portion of the exterior sealing member against an inner circumference surface of the housing hole;
   a retainer that is encompassed within the reinforcing ring so that the interior of the reinforcing ring surrounds the exterior of the retainer;
   an auxiliary sealing member in the reinforcing ring that has one end portion that is pinched and retained between the retainer and the reinforcing ring and the other end portion that is pressed against the outer circumference surface of the shaft; and
   an elastic engagement unit that is provided between the retainer and the reinforcing ring, the elastic engagement unit being configured to deform elastically to permit the retainer to be accommodated in the reinforcing ring when the retainer is mounted in the reinforcing ring and being configured to be elastically restored to engage with a counterpart to prevent the retainer from dropping out of the reinforcing ring when the auxiliary sealing member is pinched and retained between the retainer and the reinforcing ring.

2. The sealing device according to claim 1, wherein the reinforcing ring includes a cylindrical mounting portion,
   the retainer is formed into a cylindrical shape and includes a pinching portion that pinches and retains the one end portion of the auxiliary sealing member between the reinforcing ring and the pinching portion,
   the elastic engagement unit includes
   an engagement portion that is formed adjacent to the mounting portion in the reinforcing ring and has an inside diameter that is smaller than an inside diameter of the mounting portion, and
   a plurality of elastic tongue pieces that is extended from a region forming an outer circumference edge of the pinching portion of the retainer,
   in a no-load state, the plurality of elastic tongue pieces form a circumscribed circle that is larger than the inside diameter of the engagement portion,
   when the plurality of elastic tongue pieces elastically deform inward, the plurality of elastic tongue pieces form a circumscribed circle that is smaller than the inside diameter of the engagement portion, and
   when the auxiliary sealing member is pinched and retained between the reinforcing ring and the retainer, the plurality of elastic tongue pieces are disposed in the mounting portion of the reinforcing ring through the engagement portion of the reinforcing ring.

3. The sealing device according to claim 1, wherein the reinforcing ring includes a cylindrical mounting portion,
   the retainer is formed into a cylindrical shape and includes a pinching portion and an inner cylinder portion, the pinching portion is configured to pinch and retain the one end portion of the auxiliary sealing member between the reinforcing ring and the pinching portion, the inner cylinder portion having an outside diameter that is insertable in the mounting portion,
   the elastic engagement unit includes an elastic protrusion protruded inward from a region adjacent to the mounting portion in the reinforcing ring, the elastic protrusion is configured to form, in a no-load state, an inscribed circle that is smaller than the outside diameter of the inner cylinder portion and is configured to form an inscribed circle that is larger than the outside diameter of the inner cylinder portion when the elastic protrusion deforms elastically outward, and
   when the auxiliary sealing member is pinched and retained between the reinforcing ring and the retainer, the inner cylinder portion of the retainer is disposed in the mounting portion through the elastic protrusion.

4. The sealing device according to claim 1, wherein the elastic engagement unit is formed in an end portion of an opening of the reinforcing ring, in which the retainer is mounted.

5. The sealing device according to claim 1, wherein the reinforcing ring is formed into an annular shape and retains the fitting portion of the exterior sealing member via a recessed engagement portion in an outer circumference thereof.

* * * * *